(12) United States Patent
Araujo-Da-Silva et al.

(10) Patent No.: US 7,351,759 B2
(45) Date of Patent: Apr. 1, 2008

(54) RUBBER COMPOSITION FOR A TIRE COMPRISING A COUPLING AGENT HAVING A POLYTHIOSULFENAMIDE FUNCTION

(75) Inventors: José-Carlos Araujo-Da-Silva, Pont-du-Chateau (FR); Christiane Blanchard, Riom (FR); Gérard Mignani, Lyons (FR); Salvatore Pagano, Chamalieres (FR); Jean-Claude Tardivat, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 499 days.

(21) Appl. No.: 10/733,613

(22) Filed: Dec. 11, 2003

(65) Prior Publication Data

US 2004/0181000 A1  Sep. 16, 2004

Related U.S. Application Data (63) Continuation of application No. PCT/EP02/06954, filed on Jun. 24, 2002.

(30) Foreign Application Priority Data

Jun. 28, 2001 (FR) .................................. 01 08786

(51) Int. Cl.
*B60C 1/00* (2006.01)
*C08K 5/548* (2006.01)

(52) U.S. Cl. ..................... 524/262; 524/261; 524/492; 524/571; 524/573; 524/574; 524/575.5; 152/905

(58) Field of Classification Search ................ 524/261, 524/262
See application file for complete search history.

(56) References Cited

U.S. PATENT DOCUMENTS 4,292,234 A * 9/1981 Borel .......................... 524/565
5,996,663 A * 12/1999 Garro et al. ................ 152/564
2004/0254269 A1* 12/2004 Barruel et al. ................ 524/86

* cited by examiner

*Primary Examiner*—Vasu Jagannathan
*Assistant Examiner*—Vickey Ronesi
(74) *Attorney, Agent, or Firm*—Buchanan Ingersoll & Rooney PC (57) ABSTRACT

An elastomeric composition usable for the manufacture of tires, based on at least (i) a diene elastomer, (ii) an inorganic filler as reinforcing filler and (iii), as (inorganic filler/diene elastomer) coupling agent, a polysilylated organosilicon compound which is at least bifunctional and can be grafted onto the elastomer by means of a sulfur group having a polythiosulfenamide function, of formula:

$$\equiv Si-A-S_x-NR^1R^2, \qquad (I)$$

in which:
A is a divalent bond group, whether straight-chain or branched, which makes it possible to join the polythiosulfenamide group to a first silicon atom of the organosilicon compound;
x is an integer or fractional number of from 2 to 4;
$R^1$ represents hydrogen, a monovalent hydrocarbon group, or $R^2$; and
$R^2$ represents the grouping:

—B—Si≡, in which:
B is a divalent bond group, whether straight-chain or branched;
Si represents a second silicon atom of the organosilicon compound.

The invention also concerns tires and tire treads comprising a composition of this type.

33 Claims, 1 Drawing Sheet

RUBBER COMPOSITION FOR A TIRE COMPRISING A COUPLING AGENT HAVING A POLYTHIOSULFENAMIDE FUNCTION

CROSS REFERENCES TO RELATED APPLICATIONS

This application is a continuation of application PCT/EP02/06954, filed on 24 Jun. 2002, and published on 09 Jan. 2003 as WO 03/002653 in the French language. The present application also claims priority to French national application FR01/08786, filed on 28 Jun. 2001.

BACKGROUND OF THE INVENTION

The present invention relates to compositions of diene elastomers reinforced with a white or inorganic filler, intended particularly for the manufacture of tires or of semi-finished products for tires, in particular of treads for these tires.

It relates more particularly to the use, in such compositions, of bonding agents for coupling reinforcing inorganic fillers and diene elastomers.

It is generally known that in order to obtain the optimum reinforcement properties imparted by a filler, the latter should be present in the elastomeric matrix in a final form which is both as finely divided as possible and distributed as homogeneously as possible. Now, such conditions may only be obtained insofar as the filler has a very good ability firstly to be incorporated into the matrix during mixing with the elastomer and to disagglomerate, and secondly to be dispersed homogeneously in this matrix.

It is fully known that carbon black has such abilities, which is generally not true of inorganic fillers, because, for reasons of mutual attraction, the inorganic filler particles have an irritating tendency to agglomerate together within the elastomeric matrix. These interactions have the harmful consequence of limiting the dispersion of the filler and hence the reinforcing properties to a substantially lower level than that which it would be theoretically possible to achieve if all the (inorganic filler/elastomer) bonds that could be created during the mixing operation were in fact obtained. These interactions furthermore tend to increase the viscosity of the rubber compositions in the uncured state and therefore to make them more difficult to work ("processability") than in the presence of carbon black.

Since fuel economies and the need to protect the environment have become priorities, it has however proved necessary to produce tires having reduced rolling resistance, without adversely affecting their wear resistance. This has been made possible in particular due to the discovery of new rubber compositions reinforced with specific inorganic fillers referred to as "reinforcing" fillers, which are capable of rivaling a conventional tire-grade carbon black from the reinforcing point of view, while offering these compositions a lower hysteresis, which is synonymous with lesser rolling resistance for the tires comprising them, and also very good grip properties on wet, snow-covered or icy ground.

Such rubber compositions comprising reinforcing inorganic fillers for example of the silica or alumina type have for example been described in the patents or patent applications EP 501 227 or U.S. Pat. No. 5,227,425, EP 735 088 or U.S. Pat. No. 5,852,099, EP 810 258 or U.S. Pat. No. 5,900,449, EP 881 252, WO99/02590, WO99/06480, WO00/05300, WO00/05301 and WO02/10269.

Mention will be made in particular of documents EP 501 227, EP 735 088 or EP 881 252, which disclose diene rubber compositions reinforced with precipitated silicas of high dispersibility, such compositions making it possible to manufacture treads having a significantly improved rolling resistance, without adversely affecting the other properties, in particular those of grip, endurance and wear resistance. Such compositions having such a compromise of contradictory properties are also described in application EP 810 258, with specific aluminas of high dispersibility as reinforcing inorganic fillers.

Although the use of these specific, highly dispersible inorganic fillers has reduced the difficulties of processing in the uncured state the rubber compositions that contain them, they are still more difficult to process than for compositions filled conventionally with carbon black.

In particular, it is necessary to use a coupling agent, also referred to as bonding agent, the function of which is to provide the bond between the surface of the particles of inorganic filler and the elastomer, while facilitating the dispersion of this inorganic filler within the elastomeric matrix.

The term (inorganic filler/elastomer) "coupling agent" is understood in known manner to mean a compound capable of establishing a sufficient chemical and/or physical connection between the inorganic filler and the diene elastomer; such a coupling agent, which is at least bifunctional, has, for example, the simplified general formula "Y-T-X", in which:

Y represents a functional group ("Y" function) which is capable of bonding physically and/or chemically with the inorganic filler, such a bond being able to be established, for example, between a silicon atom of the coupling agent and the surface hydroxyl (OH) groups of the inorganic filler (for example, surface silanols in the case of silica);

X represents a functional group ("X" function) which is capable of bonding physically and/or chemically with the diene elastomer, for example by means of a sulfur atom;

T represents a divalent organic group making it possible to link Y and X.

The coupling agents must particularly not be confused with simple agents for covering the inorganic filler which, in known manner, may comprise the Y function which is active with respect to the inorganic filler but are devoid of the X function which is active with respect to the diene elastomer.

Coupling agents, in particular (silica/diene elastomer) coupling agents, have been described in a large number of documents, the best known being bifunctional organosilanes bearing three organoxysilyl (in particular alkoxysilyl) functions as "Y" function and, as "X" function, at least one function capable of reacting with the diene elastomer, such as, in particular, a sulfurised functional group (i.e. comprising sulfur).

Thus, it was proposed in patent applications FR 2 094 859 or GB 1 310 379 to use a mercaptoalkoxysilane coupling agent for manufacturing treads for tires. It was quickly shown, and is today well known, that mercaptoalkoxysilanes are capable of giving excellent silica/elastomer coupling properties, but that these coupling agents cannot be used industrially because of the very high reactivity of the thiol-type sulfur functions —SH ("X" functions), which very rapidly results, during the preparation of the rubber compositions, in an internal mixer, in premature vulcanization, this also being known as "scorching", in very high viscosities in the uncured state, and, finally, in rubber compositions which are virtually impossible to work and process industrially. To illustrate this problem, mention may be made for example of documents FR 2 206 330, U.S. Pat. No. 3,873,489 and U.S. Pat. No. 4,002,594.

To overcome this drawback, it has been proposed to replace these mercaptoalkoxysilanes by polysulfurised alkoxysilanes, in particular bis-(alkoxysilylpropyl) polysulfides such as described in many documents (see for example FR 2 149 339, FR 2 206 330, U.S. Pat. No. 3,842,111, U.S. Pat. No. 3,873,489 or U.S. Pat. No. 3,997,581). Among these polysulfides, mention must be made in particular of bis-3-triethoxysilylpropyl tetrasulfide (abbreviated to TESPT) or bis 3-triethoxysilylpropyl disulfide (abbreviated to TESPD).

These polysulfurised alkoxysilanes, in particular TESPT, are generally considered as the products providing, for vulcanized rubber compositions comprising a reinforcing inorganic filler, in particular silica, the best compromise in terms of resistance to scorching, ease of processing and reinforcing ability. As such, they are the coupling agents which are most used today in rubber compositions for tires, even if they have the known drawbacks (see for example patents U.S. Pat. No. 5,652,310, U.S. Pat. No. 5,684,171, U.S. Pat. No. 5,684,172) of being relatively costly and, what is more, of needing to be used most frequently in relatively large quantities.

BRIEF SUMMARY OF THE INVENTION

Now, unexpectedly, during the course of its research, the Applicant discovered that specific coupling agents may have a superior coupling performance to that of polysulfurised alkoxysilanes, in particular that of TESPT, in rubber compositions for tires.

These coupling agents are organosilicon compounds which have the essential characteristic of bearing, as X function, a specific polythiosulfenamide functional group. Furthermore, they do not have the aforementioned scorching and processing problems which are linked to excessive viscosity of the rubber compositions in the uncured state, which disadvantages are found in particular with mercaptosilanes.

Consequently, a first subject of the invention relates to an elastomeric composition usable for the manufacture of tires, comprising at least, as base constituents, (i) a diene elastomer, (ii) an inorganic filler as reinforcing filler and (iii), as (inorganic filler/diene elastomer) coupling agent, a polysilylated organosilicon compound which is at least bifunctional and can be grafted onto the elastomer by means of a sulfur group having a polythiosulfenamide function, of formula:

$$\equiv Si\text{-}A\text{-}S_x\text{—}NR^1R^2 \qquad (I)$$

in which:
A is a divalent bond group, whether straight-chain or branched, which makes it possible to join the polythiosulfenamide group to a first silicon atom of the organosilicon compound;
x is an integer or fractional number of from 2 to 4;
$R^1$ represents hydrogen, a monovalent hydrocarbon group or $R^2$;
$R^2$ represents the grouping:

—B—Si≡, in which:
B is a divalent bond group, whether straight-chain or branched;
Si represents a second silicon atom of the organosilicon compound.

Another subject of the invention is the use of a rubber composition according to the invention for the manufacture of tires or for the manufacture of semi-finished products intended for such tires, these semi-finished products being selected in particular from among the group comprising treads, underlayers intended for example to be positioned beneath these treads, crown reinforcement plies, sidewalls, carcass reinforcement plies, beads, protectors, inner tubes and airtight internal rubbers for tubeless tires.

A further subject of the invention is these tires and these semi-finished products themselves, when they comprise an elastomeric composition according to the invention, these tires being intended to be fitted on passenger vehicles, 4×4 vehicles (having 4 driving wheels), SUVs ("Sport Utility Vehicles"), two-wheeled vehicles (in particular bicycles or motorcycles), and also industrial vehicles selected from among vans, "heavy vehicles"—i.e. subway trains, buses, road transport machinery (lorries, tractors, trailers), off-road vehicles—, agricultural machinery or construction machinery, aircraft and other transport or handling vehicles.

The invention relates in particular to treads for tires, these treads being able to be used in the manufacture of new tires or for recapping worn tires; owing to the compositions of the invention, these treads have all of the following: low rolling resistance, very good grip and high wear resistance.

The invention also relates to a process for the preparation of a rubber composition usable for the manufacture of tires, such a process comprising the following steps:
incorporating in a diene elastomer, in a mixer, at least:
a reinforcing inorganic filler;
as (inorganic filler/diene elastomer) coupling agent, an organosilicon compound which is at least bifunctional and can be grafted onto the elastomer by means of a sulfur group;
thermomechanically kneading the entire mixture, in one or more stages, until a maximum temperature of between 110° C. and 190° C. is reached;
cooling the entire mixture to a temperature of less than 100° C.;
then incorporating a vulcanization system;
kneading the entire mixture until a maximum temperature of less than 120° C. is reached, and being characterized in that said sulfur group satisfies the aforementioned formula (I)

A further subject of the invention is the use as (inorganic filler/diene elastomer) coupling agent, in a composition based on diene elastomer reinforced by an inorganic filler intended for the manufacture of tires, of an organosilicon compound, which is at least bifunctional and can be grafted on to the elastomer by means of a sulfur group, having a polythiosulfenamide function, of the aforementioned formula (I).

Finally, a subject of the invention is a process for coupling an inorganic filler and a diene elastomer, in an elastomeric composition usable for the manufacture of tires, such process comprising the following steps:
incorporating in a diene elastomer, in a mixer, at least:
a reinforcing inorganic filler;
as (inorganic filler/diene elastomer) coupling agent, an organosilicon compound which is at least bifunctional and can be grafted onto the elastomer by means of a sulfur group;
thermomechanically kneading the entire mixture, in one or more stages, until a maximum temperature of between 110° C. and 190° C. is reached;

cooling the entire mixture to a temperature of less than 100° C. and being characterized in that said sulfur group satisfies the aforementioned formula (I).

BRIEF DESCRIPTION OF THE DRAWINGS

The invention and its advantages will be readily understood in the light of the description and the examples of embodiment which follow, and the figures relating to these examples, which show.

DETAILED DESCRIPTION OF THE INVENTION

I. Measurements and Tests Used

The rubber compositions are characterized before and after curing, as indicated below.

I-1. Mooney Plasticity

An oscillating consistometer such as described in French Standard NF T 43-005 (1991) is used. The Mooney plasticity is measured in accordance with the following principle: the uncured composition (i.e. before curing) is molded in a cylindrical enclosure heated to 100° C. After one minute's preheating, the rotor turns within the test piece at 2 rpm, and the torque used for maintaining this movement is measured after four minutes of rotation. The Mooney plasticity (ML 1+4) is expressed in "Mooney units" (MU, with 1 MU=0.83 Newton.meter).

I-2. Scorching Time

The measurements are effected at 130° C., in accordance with French Standard NF T 43-005 (1991). The evolution of the consistometric index as a function of time makes it possible to determine the scorching time for the rubber compositions, assessed in accordance with the above standard by the parameter T5 (case of a large rotor), expressed in minutes, and defined as being the time necessary to obtain an increase in the consistometric index (expressed in MU) of 5 units above the minimum value measured for this index.

I-3. Rheometry

The measurements are effected at 150° C. with an oscillating-chamber rheometer, in accordance with DIN Standard 53529—part 3 (June 1983). The evolution of the rheometric torque as a function of time (see attached FIG. 1) describes the evolution of the stiffening of the composition following the vulcanization reaction. The measurements are processed in accordance with DIN Standard 53529—part 2 (March 1983): $t_i$ is the induction period, that is to say, the time necessary for the start of the vulcanization reaction; $t_\alpha$ (for example $t_{90}$ or $t_{99}$) is the time necessary to achieve a conversion of $\alpha$%, that is to say $\alpha$% (for example 90% or 99%, respectively) of the deviation between the minimum and maximum torques. The conversion rate constant K (expressed in $min^{-1}$) of order 1, calculated between 30% and 80% conversion, is also measured, which makes it possible to assess the vulcanization kinetics.

I-4. Tensile Tests

These tests make it possible to determine the elasticity stresses and the properties at break. Unless indicated otherwise, they are effected in accordance with French Standard NF T 46-002 of September 1988. The nominal secant moduli (or apparent stresses, in MPa) at 10% elongation (ME10), 100% elongation (ME100) and 300% elongation (ME300) are measured in a second elongation (i.e. after an accommodation cycle). The breaking stresses (in MPa) and the elongations at break (in %) are also measured. All these tensile measurements are effected under normal conditions of temperature (23+2° C.) and humidity (50+5% relative humidity), in accordance with French Standard NF T 40-101 (December 1979).

Processing the tensile data recorded also makes it possible to trace the curve of the modulus as a function of the elongation (see FIG. 2), the modulus used here being the true secant modulus measured in a first elongation, calculated reduced to the real cross-section of the test sample and not to the initial section, as previously for the nominal moduli.

II. Conditions of Implementation of the Invention

The rubber compositions according to the invention are based on at least each of the following constituents: (i) a (at least one) diene elastomer, (ii) a (at least one) inorganic filler as reinforcing filler, and (iii) a (at least one) specific organosilicon compound as (inorganic filler/diene elastomer) coupling agent.

Of course, the expression composition "based on" is to be understood to mean a composition comprising the mix and/or the product of reaction in situ of the various constituents used, some of these base constituents being liable to, or intended to, react together, at least in part, during the different phases of manufacture of the composition, in particular during the vulcanization thereof.

II-1. Diene Elastomer

"Diene" elastomer or rubber is understood to mean, in known manner, an elastomer resulting at least in part (i.e. a homopolymer or a copolymer) from diene monomers (monomers bearing two double carbon-carbon bonds, whether conjugated or not).

In general, "essentially unsaturated" diene elastomer is understood here to mean a diene elastomer resulting at least in part from conjugated diene monomers, having a content of members or units of diene origin (conjugated dienes) which is greater than 15% (mol %).

Thus, for example, diene elastomers such as butyl rubbers or copolymers of dienes and of alpha-olefins of the EPDM type do not fall within the preceding definition, and may in particular be described as "essentially saturated" diene elastomers (low or very low content of units of diene origin which is always less than 15%).

Within the category of "essentially unsaturated" diene elastomers, "highly unsaturated" diene elastomer is understood to mean in particular a diene elastomer having a content of units of diene origin (conjugated dienes) which is greater than 50%.

These definitions being given, the following are understood more particularly to be meant by diene elastomer capable of being used in the compositions according to the invention:

(a)—any homopolymer obtained by polymerization of a conjugated diene monomer having 4 to 12 carbon atoms;

(b)—any copolymer obtained by copolymerization of one or more dienes conjugated together or with one or more vinyl aromatic compounds having 8 to 20 carbon atoms;

(c)—a ternary copolymer obtained by copolymerization of ethylene, of an □-olefin having 3 to 6 carbon atoms with a non-conjugated diene monomer having 6 to 12 carbon atoms, such as, for example, the elastomers obtained from ethylene, from propylene with a non-conjugated diene monomer of the aforementioned type, such as in particular 1,4-hexadiene, ethylidene norbornene or dicyclopentadiene;

(d)—a copolymer of isobutene and isoprene (butyl rubber), and also the halogenated, in particular chlorinated or brominated, versions of this type of copolymer.

Although it applies to any type of diene elastomer, the person skilled in the art of tires will understand that the present invention, in particular when the rubber composition is intended for a tire tread, is used first and foremost with essentially unsaturated diene elastomers, in particular those of type (a) or (b) above.

Suitable conjugated dienes are, in particular: 1,3-butadiene, 2-methyl-1,3-butadiene, 2,3-di($C_1$-$C_5$ alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Suitable vinyl-aromatic compounds are, for example, styrene, ortho-, meta- and para-methylstyrene, the commercial mixture "vinyltoluene", para-tertbutylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinyl aromatic units. The elastomers may have any microstructure, which is a function of the polymerization conditions used, in particular of the presence or absence of a modifying and/or randomizing agent and the quantities of modifying and/or randomizing agent used. The elastomers may for example be block, statistical, sequential or microsequential elastomers, and may be prepared in dispersion or in solution; they may be coupled and/or starred or alternatively functionalized with a coupling and/or starring or functionalizing agent.

Preferred are polybutadienes, and in particular those having a content of 1,2-units between 4% and 80%, or those having a content of cis-1,4 of more than 80%, polyisoprenes, butadiene-styrene copolymers, and in particular those having a styrene content of between 5% and 50% by weight and, more particularly, between 20% and 40%, a content of 1,2-bonds of the butadiene fraction of between 4% and 65%, and a content of trans-1,4 bonds of between 20% and 80%, butadiene-isoprene copolymers and in particular those having an isoprene content of between 5% and 90% by weight and a glass transition temperature (Tg, measured in accordance with ASTM Standard D3418-82) of from −40° C. to −80° C., isoprene-styrene copolymers and in particular those having a styrene content of between 5% and 50% by weight and a Tg of between −25° C. and −50° C. In the case of butadiene-styrene-isoprene copolymers, those which are suitable are in particular those having a styrene content of between 5% and 50% by weight and, more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene fraction of between 4% and 85%, a content of trans-1,4 units of the butadiene fraction of between 6% and 80%, a content of 1,2- plus 3,4-units of the isoprene fraction of between 5% and 70%, and a content of trans-1,4 units of the isoprene fraction of between 10% and 50%, and more generally any butadiene-styrene-isoprene copolymer having a Tg of between −20° C. and −70° C.

In summary, particularly preferably, the diene elastomer of the composition according to the invention is selected from the group of highly unsaturated diene elastomers which consists of polybutadienes (BR), polyisoprenes (IR), natural rubber (NR), butadiene copolymers, isoprene copolymers and mixtures of these elastomers. Such copolymers are more preferably selected from the group which consists of butadiene-styrene copolymers (SBR), butadiene-isoprene copolymers (BIR), isoprene-styrene copolymers (SIR) and isoprene-butadiene-styrene copolymers (SBIR).

The composition according to the invention is particularly intended for a tread for a tire, be it a new or a used tire (case of recapping).

In the case of a passenger-car tire, the diene elastomer is for example an SBR, be it an SBR prepared in emulsion ("ESBR") or an SBR prepared in solution ("SSBR"), or an SBR/BR, SBR/NR (or SBR/IR), or alternatively BR/NR (or BR/IR), blend (mixture). In the case of an SBR elastomer, in particular an SBR having a styrene content of between 20% and 30% by weight, a content of vinyl bonds of the butadiene fraction of between 15% and 65%, a content of trans-1,4 bonds of between 15% and 75%, and a Tg of between −20° C. and −55° C. is used. Such an SBR copolymer, preferably prepared in solution (SSBR), is possibly used in a mixture with a polybutadiene (BR) having preferably more than 90% cis-1,4 bonds.

In the case of a tire for a utility vehicle, in particular for a heavy vehicle, the diene elastomer is in particular an isoprene elastomer; isoprene elastomer" is understood to mean, in known manner, an isoprene homopolymer or copolymer, in other words a diene elastomer selected from the group consisting of natural rubber (NR), synthetic polyisoprenes (IR), the various isoprene copolymers and mixtures of these elastomers. Of the isoprene copolymers, mention will be made in particular of isobutene-isoprene copolymers (butyl rubber—IIR), isoprene-styrene copolymers (SIR), isoprene-butadiene copolymers (BIR) or isoprene-butadiene-styrene copolymers (SBIR). This isoprene elastomer is preferably natural rubber or a synthetic cis-1,4 polyisoprene; of these synthetic polyisoprenes, preferably polyisoprenes having a content (mole %) of cis-1,4 bonds greater than 90%, more preferably still greater than 98%, are used. For such a tire for a utility vehicle, the diene elastomer may also be constituted, in its entirety or in part, of another highly unsaturated elastomer such as, for example, an SBR elastomer.

According to another advantageous embodiment of the invention, in particular when it is intended for a tire sidewall, the composition according to the invention may contain at least one essentially saturated diene elastomer, in particular at least one EPDM copolymer, whether this copolymer be used or not used, for example, in a mixture with one or more of the highly unsaturated diene elastomers mentioned above.

The compositions of the invention may contain a single diene elastomer or a mixture of several diene elastomers, the diene elastomer or elastomers possibly being used in association with any type of synthetic elastomer other than a diene elastomer, or even with polymers other than elastomers, for example thermoplastic polymers.

II-2. Reinforcing Filler

The white or inorganic filler used as reinforcing filler may constitute all or only part of the total reinforcing filler, in this latter case associated, for example, with carbon black.

Preferably, in the rubber compositions according to the invention, the reinforcing inorganic filler constitutes the majority, i.e. more than 50% by weight, of the total reinforcing filler, more preferably more than 80% by weight of this total reinforcing filler.

In the present application, "reinforcing inorganic filler", in known manner, is understood to mean an inorganic or mineral filler, whatever its color and its origin (natural or synthetic), also referred to as "white" filler or sometimes "clear" filler in contrast to carbon black, this inorganic filler being capable, on its own, without any other means than an intermediate coupling agent, of reinforcing a rubber composition intended for the manufacture of tires, in other words which is capable of replacing a conventional tire-grade carbon black filler in its reinforcement function.

Preferably, the reinforcing inorganic filler is a mineral filler of the type silica ($SiO_2$) or alumina ($Al_2O_3$), or a mixture of these two fillers.

The silica used may be any reinforcing silica known to the person skilled in the art, in particular any precipitated or fumed silica having a BET surface area and a specific CTAB surface area both of which are less than 450 m$^2$/g, preferably from 30 to 400 m$^2$/g. Highly dispersible precipitated silicas (referred to as "HDS") are preferred, in particular when the invention is used for the manufacture of tires having a low rolling resistance; "highly dispersible silica" is understood in known manner to mean any silica having a substantial ability to disagglomerate and to disperse in an elastomeric matrix, which can be observed in known manner by electron or optical microscopy on thin sections. As non-limitative examples of such preferred highly dispersible silicas, mention may be made of the silica Perkasil KS 430 from Akzo, the silica BV3380 from Degussa, the silicas Zeosil 1165 MP and 1115 MP from Rhodia, the silica Hi-Sil 2000 from PPG, the silicas Zeopol 8741 or 8745 from Huber, and treated precipitated silicas such as, for example, the aluminium-"doped" silicas described in application EP-A-0 735 088.

The reinforcing alumina preferably used is a highly dispersible alumina having a BET surface area from 30 to 400 m$^2$/g, more preferably between 60 and 250 m$^2$/g, and an average particle size at most equal to 500 nm, more preferably at most equal to 200 nm, as described in the aforementioned application EP-A-0 810 258. Non-limitative examples of such reinforcing aluminas are in particular the aluminas "Baikalox" "A125", "CR125" and "D65CR" from Baïkowski.

The physical state in which the reinforcing inorganic filler is present is immaterial, whether it be in the form of a powder, microbeads, granules or alternatively balls. Of course, "reinforcing inorganic filler" is also understood to mean mixtures of different reinforcing inorganic fillers, in particular of highly dispersible silicas and/or aluminas such as described above.

When the rubber compositions of the invention are used as treads for tires, the reinforcing inorganic filler used, in particular if it is silica, preferably has a BET surface area of between 60 and 250 m$^2$/g, more preferably between 80 and 200 m$^2$/g.

The reinforcing inorganic filler may also be used in a blend (mixture) with carbon black. Suitable carbon blacks are all the carbon blacks, in particular the blacks of the type HAF, ISAF and SAF, which are conventionally used in tires, and particularly in treads for tires. As non-limitative examples of such blacks, mention may be made of the blacks N115, N134, N234, N339, N347 and N375.

The amount of carbon black present in the total reinforcing filler may vary within wide limits, this amount of carbon black preferably being less than the amount of reinforcing inorganic filler present in the rubber composition.

In the compositions according to the invention, in particular in the treads incorporating such compositions, it is preferred to use, in a small proportion, a carbon black in association with the reinforcing inorganic filler, in a preferred amount of between 2 and 20 phr, more preferably within a range from 5 to 15 phr. Within the ranges indicated, it was noted that there was a benefit to be had from the coloring properties (black pigmentation agent) and anti-UV properties of the carbon blacks, without furthermore adversely affecting the typical performance provided by the reinforcing inorganic filler, namely low hysteresis (reduced rolling resistance) and high adhesion on wet, snow-covered or icy ground.

Preferably, the amount of total reinforcing filler (reinforcing inorganic filler plus carbon black if applicable) is between 10 and 200 phr, more preferably between 20 and 150 phr, the optimum differing according to the intended applications, because the level of reinforcement expected of a bicycle tire, for example, is in known manner distinctly lower than that required for a tire liable to travel at a sustained high speed, for example a motorcycle tire, a passenger-vehicle tire or a tire for a utility vehicle such as a heavy vehicle.

For treads for such tires which are capable of traveling at high speed, the quantity of reinforcing inorganic filler, in particular in the case of silica, is preferably between 30 and 140 phr, more preferably within a range from 50 to 120 phr.

In the present specification, the BET specific surface area is determined in known manner, in accordance with the method of Brunauer, Emmett and Teller described in "*The Journal of the American Chemical Society*", vol. 60, page 309, February 1938, and corresponding to French Standard NF T 45-007 (November 1987); the CTAB specific surface area is the external surface area determined in accordance with the same Standard NF T 45-007.

Finally, the person skilled in the art will understand that, as filler equivalent to the reinforcing inorganic filler described in the present section, there could be used a reinforcing organic filler, in particular a carbon black, covered at least in part with an inorganic layer, for example silica, which for its part requires the use of a coupling agent to provide the bond to the elastomer.

II-3. Coupling Agent (Organosilicon Compound)

As explained previously, an (inorganic filler/diene elastomer) coupling agent, in known manner, bears at least two functions, referred to here as "Y" and "X", which enable it to be grafted, on one hand to the reinforcing inorganic filler by means of the Y function, for example a hydroxyl group or a hydrolyzable group, and on the other hand to the diene elastomer by means of the X function, for example a sulfur function.

One essential characteristic of the polysilylated organosilicon compound used as coupling agent in the compositions according to the invention is that this compound can be grafted onto the elastomer by means of a sulfur group having a polythiosulfenamide function, of formula:

$$\equiv Si\text{-}A\text{-}S_x\text{—}NR^1R^2, \quad (I)$$

in which:
A is a divalent bond group, whether straight-chain or branched, which makes it possible to join the polythiosulfenamide group to a first silicon atom of the organosilicon compound;
x is an integer or fractional number of from 2 to 4;
$R^1$ represents hydrogen, a monovalent hydrocarbon group or $R^2$;

$R^2$ represents the grouping:

in which:
B is a divalent bond group, whether straight-chain or branched;
Si represents a second silicon atom of the organosilicon compound.

It will be recalled here that "organosilicon" (or "organosilicic") compound is to be understood to mean, by definition, an organic compound comprising at least one carbon-silicon bond. It will be understood that the compound of formula (I) above, which bears at least two different silicon atoms (at least one bonded to the group A, at least one other bonded to the group B), therefore falls within the category of organosilicon compounds of the polysilylated type. It will furthermore be noted that when $R^1$ is identical (in its general formula) to $R^2$, then the compound of formula (I) bears at least three different silicon atoms.

In formula (I) above, in the case in which the synthesis path of the compound in question can give rise to only a single type of polysulfurised group, the number x is then an integer which is equal to 2, 3 or 4, preferably equal to 2 or 3.

However, the person skilled in the art will readily understand that this number may be an average fractional number when the synthesis path gives rise to a mixture of polysulfurized groups each having a different number of sulfur atoms. In such a case, the polythiosulfenamide group which is synthesized is in fact formed of a distribution of polysulfides, from the disulfide $S_2$ to heavier polysulfides, centered on an average value (in mole) of the "x"s (fractional number) of between 2 and 4, more preferably of between 2 and 3.

The divalent group A is preferably selected from among aliphatic hydrocarbon groups, whether saturated or unsaturated, carbocyclic groups, whether saturated, unsaturated or/and aromatic, monocyclic or polycyclic, and groups having an aliphatic hydrocarbon portion, whether saturated or unsaturated and a carbocyclic portion such as defined above.

This bond group A preferably comprises from 1 to 18 carbon atoms, and represents more preferably an alkylene chain, a saturated cycloalkylene group, an arylene group, or a divalent group consisting of a combination of at least two of these groups.

The monovalent hydrocarbon group represented by R1 may be aliphatic, straight-chain or branched, or carbocyclic, in particular aromatic; it may be substituted or non-substituted, saturated or unsaturated. In the case of an aliphatic hydrocarbon group, this comprises in particular from 1 to 25 carbon atoms, more preferably from 1 to 12 carbon atoms.

By way of example of a saturated aliphatic hydrocarbon group, mention may be made of alkyl groups such as methyl, ethyl, propyl, isopropyl, butyl, isobutyl, tert. butyl, pentyl, isopentyl, neopentyl, 2-methylbutyl, 1-ethylpropyl, hexyl, isohexyl, neohexyl, 1-methylpentyl, 3-methylpentyl, 1,1-dimethylbutyl, 1,3-dimethylbutyl, 2-ethylbutyl, 1-methyl-1-ethylpropyl, heptyl, 1-methylhexyl, 1-propylbutyl, 4,4-dimethylpentyl, octyl, 1-methylheptyl, 2-ethylhexyl, 5,5-dimethylhexyl, nonyl, decyl, 1-methylnonyl, 3,7-dimethyloctyl and 7,7-dimethyloctyl.

The unsaturated aliphatic hydrocarbon groups which are usable comprise one or more unsaturated sites, preferably one, two or three unsaturated sites of ethylenic type (double bond) or/and acetylenic type (triple bond). Examples are the alkenyl or alkynyl groups deriving from the alkyl groups defined above by elimination of two hydrogen atoms, or more. Preferably, the unsaturated aliphatic hydrocarbon groups comprise a single unsaturated site.

"Carbocyclic radical" is understood to mean a monocyclic or polycyclic radical, possibly substituted, preferably a $C_3$-$C_{50}$ radical. Advantageously, it is a $C_3$-$C_{18}$ radical which is preferably mono-, bi- or tricyclic. When the carbocyclic radical comprises more than one cyclic core (as is the case with polycyclic carbocycles), the cyclic cores are condensed two by two. Two condensed cores may be ortho-condensed or peri-condensed.

The carbocyclic radical may, unless indicated otherwise, comprise a saturated portion and/or an aromatic portion and/or an unsaturated portion.

Examples of saturated carbocyclic radicals are cycloalkyl groups. Preferably, the cycloalkyl groups are $C_3$-$C_{18}$, better still $C_5$-$C_{10}$, groups. Mention may be made in particular of the radicals cyclopentyl, cyclohexyl, cycloheptyl, cyclooctyl, adamantyl or norbornyl.

The unsaturated carbocycle or any unsaturated portion of carbocyclic type has one or more ethylenically unsaturated sites, preferably one, two or three. It advantageously comprises from 6 to 50 carbon atoms, better still from 6 to 20, for example from 6 to 18 carbon atoms.

Examples of unsaturated carbocycles are $C_6$-$C_{10}$ cycloalkenyl groups. Examples of aromatic carbocyclic radicals are $C_6$-$C_{18}$ aryl groups and in particular phenyl, naphthyl, anthryl and phenanthryl.

A group having both an aliphatic hydrocarbon portion and a carbocyclic portion as defined above is, for example, an arylalkyl group such as benzyl, or an alkylaryl group such as tolyl.

The substituents of the aliphatic hydrocarbon groups or portions and of the carbocyclic groups or portions are, for example, alkoxyl groups in which the alkyl portion is preferably such as defined above.

$R^1$ preferably comprises from 1 to 25 carbon atoms. According to one particularly preferred embodiment, $R^1$ is selected from the group consisting of hydrogen, $C_1$-$C_8$ alkyls, whether straight-chain or branched, $C_5$-$C_{10}$ cycloalkyls, $C_6$-$C_{18}$ aryls, ($C_6$-$C_{18}$)aryl-($C_1$-$C_8$)alkyls and $R^2$. More preferably still, $R^1$ is selected from the group consisting of hydrogen, methyl, ethyl, propyl, isopropyl, butyl, hexyl, benzyl, cyclohexyl, phenyl, benzyl and $R^2$.

The divalent bond groups A and B, which may be identical or different, preferably comprising from 1 to 18 carbon atoms, are more preferably selected from among $C_1$-$C_{18}$ alkylenes (hereafter referred to as "Z"), and $C_6$-$C_{12}$ arylenes; they may be substituted or interrupted by one or more heteroatoms, selected in particular from among S, O and N.

Thus, according to a particularly preferred embodiment of the invention, the sulfur group of formula (I) satisfies the specific formulae (II) (in this case, A=B=Z) or (III) (in this case, A=Z and B=—$S_y$-Z-) which follow:

or:

in which the groupings Z, which may be identical or different, represent a $C_1$-$C_8$ alkylene, and y, which may be identical to or different from x, is an integer or fractional number from 2 to 4.

In these formulae (II) and (III), Z more preferably represents a $C_1$-$C_4$ alkylene chain, in particular methylene, ethylene or propylene, more preferably still propylene.

In formulae (I), (II) and (III) above, $R^2$ advantageously represents the grouping:

$$—B—SiR^3_{(3-a)}(OR^4)_a,$$

in which:
- $R^3$ represents a monovalent hydrocarbon group;
- $R^4$ represents hydrogen or a monovalent hydrocarbon group, which is identical to or different from $R^3$;
- a is an integer equal to 1, 2 or 3;
- with in particular B=Z in the case of the specific formula (II), or B=—$S_y$-Z- in the case of the specific formula (III).

The radicals $R^3$ and $R^4$, which may be identical or different, are hydrocarbon groups selected in particular from among aliphatic hydrocarbon groups, whether saturated or unsaturated, carbocyclic groups, whether saturated, unsaturated or/and aromatic, monocyclic or polycyclic, and groups having an aliphatic hydrocarbon portion, whether saturated or unsaturated, and a carbocyclic portion such as defined above, preferably comprising from 1 to 18 carbon atoms, these different groups possibly being substituted or not substituted.

The radicals $R^3$, which may be identical or different if they are several in number, preferably represent an alkyl, a cycloalkyl or an aryl. They are more preferably selected from among the group consisting of $C_1$-$C_8$ alkyls, $C_5$-$C_{10}$ cycloalkyls (in particular cyclohexyl) and phenyl. More preferably still, $R^3$ is selected from the group consisting of $C_1$-$C_6$ alkyls (in particular methyl, ethyl, propyl and isopropyl).

The radicals $R^4$, which may be identical or different if they are several in number, preferably represent an alkyl, a cycloalkyl, an acyl or an aryl. They are more preferably selected from among the group consisting of $C_1$-$C_8$ alkyls, possibly halogenated and/or possibly substituted by one or more ($C_2$-$C_8$) alkoxys; $C_2$-$C_9$ acyls, possibly halogenated and/or possibly substituted by one or more ($C_2$-$C_8$) alkoxys; $C_5$-$C_{10}$ cycloalkyls and $C_6$-$C_{18}$ aryls. More preferably still, $R^4$ is selected from the group consisting of $C_1$-$C_8$ alkyls (in particular methyl, ethyl, n-propyl, isopropyl, n-butyl, β-chloropropyl, β-chloroethyl), possibly substituted by one or more ($C_2$-$C_8$) alkoxys (in particular methoxy, ethoxy, propoxy, isopropoxy); $C_5$-$C_{10}$ cycloalkyls and phenyl.

According to the best embodiment known, $R^3$ and $R^4$, which may be identical or different, are both selected (if a≠3) from among $C_1$-$C_4$ alkyls, in particular from among methyl and ethyl.

The person skilled in the art will be able to adapt the nature of the Y function to the specific organosilicon compound in question on which is grafted the polythiosulfenamide group, by means of bond group A, this function Y possibly being different, for example a hydroxyl or hydrolysable group, according to the type of organosilicon compound in question.

Without this embodiment being limitative, this organosilicon compound is preferably a silane compound bearing as Y function one or more (maximum of 3) (OR) groups fixed to a silicon atom, R representing hydrogen or a monovalent hydrocarbon group, whether straight-chain or branched (in particular alkyl).

Thus, there may be used as organosilicon compound particularly suitable for the invention a polysilylated polythiosulfenamide silane of the general formula:

$$(R^6O)_bR^5_{(3-b)}Si\text{-}A\text{-}S_x—NR^1—B—SiR^3_{(3-a)}(OR^4)_a, \quad (IV)$$

in which:
- $R^5$ represents a monovalent hydrocarbon group;
- $R^6$ represents hydrogen or a monovalent hydrocarbon group, which is identical to or different from $R^5$;
- b is an integer equal to 1, 2 or 3;
- $R^5$, $R^6$ and b possibly being, respectively, identical to or different from $R^3$, $R^4$ and a.

In formula (IV) above, $R^5$, $R^6$ and b have the general preferred meanings given above, respectively, for $R^3$, $R^4$ and a. In particular, $R^5$ is more preferably selected from among the group consisting of $C_1$-$C_8$ alkyls, $C_5$-$C_{10}$ cycloalkyls and phenyl; more preferably, $R^6$ is selected from the group consisting of $C_1$-$C_6$ alkyls, $C_2$-$C_6$ alkoxyalkyls, $C_5$-$C_8$ cycloalkyls and phenyl.

According to the best embodiment known, $R^5$ and $R^6$, which may be identical or different, are selected from among $C_1$-$C_6$ alkyls, more preferably still from among $C_1$-$C_4$ alkyls.

The person skilled in the art will readily understand that an organosilicon compound in accordance with this formula (IV) comprises a first "Y" function [symbolized by the 1 to 3 ($OR^6$)$_b$ group(s) fixed to the first silicon atom] joined, by means of the bond group A, to the polythiosulfenamide functional group of formula (I) ["X" function symbolized by —$S_x$—N $R^1$ $R^2$], the latter having the advantageous additional characteristic of comprising at least one second "Y" function [symbolized by the 1 to 3 ($OR^4$)$_a$ group(s) joined to the second silicon atom].

As more preferred organosilicon compounds usable in the compositions of the invention, mention will be made in particular of the polysilylated polythiosulfenamide silanes of formula (IV) which correspond to one of the specific formulae below:

$$(R^6O)_bR^5_{(3-b)}Si\text{-}Z\text{-}S_x—NR^1\text{-}Z\text{-}SiR^3_{(3-a)}(OR^4)_a, \quad (V)$$

or:

$$(R^6O)_bR^5_{(3-b)}Si\text{-}Z\text{-}S_x—NR^1—S_y\text{-}Z\text{-}SiR^3_{(3-a)}(OR^4)_a \quad (VI)$$

in which the groupings Z, which may be identical or different, represent in particular a $C_1$-$C_4$ alkylene, the radicals $R^3$, $R^4$, $R^5$ and $R^6$ represent in particular a $C_1$-$C_3$ alkyl and x and y have the definitions given above, more particularly dithiosulfenamide silanes for which x is equal to 2, and y, if applicable, is also equal to 2.

In these formulae (V) and (VI), Z more preferably represents a $C_1$-$C_4$ alkylene chain, in particular methylene, ethylene or propylene, more preferably still propylene; the radicals $R^3$, $R^4$, $R^5$ and $R^6$, which may be identical or different, more preferably represent a $C_1$-$C_3$ alkyl, in particular methyl or ethyl.

Among the organosilicon compounds of formula (V), mention will be made more particularly of those for which $R^1$ is selected from the group consisting of hydrogen, methyl, ethyl, propyl, isopropyl, hexyl, benzyl, cyclohexyl and phenyl, such as, for example:

N-(3'-trimethoxysilylpropyldithio)-3-triethoxysilylpropylamine (formula V-1):

N-(3'-triethoxysilylpropyldithio)-3-triethoxysilylpropylamine (formula (V-2):

N-methyl-N-(3'-triethoxysilylpropyldithio)-3-trimethoxysilylpropylamine of formula (V-3) (Et=ethyl; Me=methyl):

According to a particularly preferred embodiment of the invention, the polysilylated polythiosulfenamide silane is a silane of symmetrical type (x=y), that is to say comprising the same number (2, 3 or 4) of S atoms on either side of the N atom, as described by formula (VI) above.

In the more specific case in which, in this formula (VI), on one hand $R^5$, $R^6$ and b are, respectively, identical to $R^3$, $R^4$ and a, on the other hand the two linkages Z are the same, such a silane, which is strictly symmetrical, then has the particularly preferred formula:

$$[(R^4O)_aR^3{}_{(3-a)}Si-Z-S_x-]_2NR^1 \qquad (VII)$$

In this formula (VII), more preferably still, $R^1$ is selected from the group consisting of hydrogen, methyl, ethyl, propyl, isopropyl, hexyl, benzyl, cyclohexyl and phenyl; Z represents a $C_1$-$C_4$ alkylene chain, more preferably propylene; the radicals $R^3$ and $R^4$, which may be identical or different if $R^3$ is present (a≠3), represent more particularly still a $C_1$-$C_3$ alkyl, in particular methyl or ethyl; x is more preferably equal to 2.

By way of examples of organosilicon compounds having a structure of formula (VII) in which x=2, mention will be made, for example, of:

N,N-bis(3-trimethoxysilylpropyldithio)cyclohexylamine of formula (VII-1):

N,N-bis(3-triethoxysilylpropyldithio)cyclohexylamine of formula (VII-2):

N,N-bis(3-trimethoxysilylpropyldithio)-3-triethoxysilylpropylamine of formula (VII-3):

The polyfunctional coupling agents above, which bear a polythiosulfenamide group, have exhibited very good reactivity with respect to the diene elastomers used in rubber compositions for tires, and have proved sufficiently effective on their own for coupling such elastomers and a reinforcing inorganic filler such as silica. Without this being limitative, they may advantageously constitute the sole coupling agent present in the rubber compositions of the invention.

So as to make allowance for the differences in specific surface area and density of the reinforcing inorganic fillers which may be used, as well as the molar masses of the coupling agents specifically used, it is preferable to determine the optimum amount of coupling agent, in moles per meter squared of reinforcing inorganic filler, for each reinforcing inorganic filler used; this optimum amount is calculated from the weight ratio [coupling agent/reinforcing-inorganic filler], the BET surface area of the filler and the molar mass of the coupling agent (referred to as M hereafter), according to the following known equation:

(moles/m² inorganic filler)=[coupling agent/inorganic filler](1/*BET*) (1/*M*)

Thus, preferably, the quantity of coupling agent used in the compositions according to the invention lies between $10^{-7}$ and $10^{-5}$ moles per m² of reinforcing inorganic filler. More preferably still, the amount of coupling agent lies between $5 \times 10^{-7}$ and $5 \times 10^{-6}$ moles per meter squared of total inorganic filler.

Taking into account the quantities expressed above, generally, the content of coupling agent will be preferably greater than 1 phr, more preferably between 2 and 20 phr. Below the minimum amounts indicated, the effect risks being inadequate, whereas beyond the maximum amount advocated generally no further improvement in the coupling is observed, while the costs of the composition increase; for these various reasons, this content of coupling agent is more preferably still between 3 and 12 phr.

The person skilled in the art will be able to adjust this content of coupling agent according to the intended application, for example the part of the tire for which the composition of the invention is intended, the nature of the diene elastomer, the quantity of reinforcing inorganic filler used and the nature of the organosilicon compound in question.

Of course, in order to reduce the costs of the rubber compositions, it is desirable to use as little as possible thereof, that is to say what is just necessary for sufficient coupling between the diene elastomer and the reinforcing inorganic filler. Its effectiveness makes it possible, in a large number of cases, to use the coupling agent in a preferred amount representing between 0.5% and 20% by weight relative to the quantity of reinforcing inorganic filler; amounts less than 15%, in particular less than 10%, are more particularly preferred.

Finally, it will be noted that the organosilicon compound previously described could be grafted beforehand (via the "Y" function) onto the reinforcing inorganic filler, the thus "precoupled" filler then being able to be later bonded to the diene elastomer by means of the free "X" function.

II-4. Synthesis of the Coupling Agent (Organosilicon Compound)

By way of example, organosilicon compounds such as described previously may be prepared in accordance with the preferred synthesis paths indicated hereafter (methods referred to as A, B or C).

A) Method "A"

The polysilylated organosilicon compounds of general formula (IV) (specific formulae (V), (VI) and (VII) included) in which x=2 (organosilicon compounds having a dithiosulfenamide function) may be obtained in particular by reacting a disulfide halide of formula:

$(R^6O)_b R^5_{(3-b)}Si\text{-}A\text{-}S\text{—}S\text{-}Hal$ (VIII)

in which A, $R^5$, $R^6$ and b are as defined above and Hal represents a halogen (bromine, chlorine, fluorine or iodine, preferably chlorine), on the appropriate amine of formula:

$HNR^1R^2$ (IX)

in which $R^1$ and $R^2$ are as defined above, in the presence of a base, preferably an organic base.

Appropriate bases are, for example, N-methylmorpholine, triethylamine, tributylamine, diisopropylethylamine, dicyclohexylamine, N-methylpiperidine, pyridine, 4-(1-pyrrolidinyl)pyridine, picoline, 4-(N,N-dimethylamino)pyridine, 2,6-di-tert. butyl-4-methylpyridine, quinoline, N,N-dimethylaniline, N,N-diethylaniline, 1,8-diazabicyclo[5.4.0]-undec-7-ene (DBU), 1,5-diazabicyclo[4.3.0]non-5-ene (DBN) and 1,4-diazabicyclo[2.2.2]-octane (DABCO or triethylenediamine).

The reaction is preferably carried out in a polar aprotic solvent such as an ether and, for example, diethyl ether, diisopropyl ether, tetrahydrofuran, dioxane, dimethoxyethane or diethyleneglycol dimethyl ether. Diethyl ether is preferred.

The reaction temperature is a function of the reactivity of the molecules present and the force of the base used. This temperature generally varies between −78° C. and ambient temperature (15-25° C.). Advantageously, a temperature of between −78° C. and −50° C. is suitable. Then, it is desirable to allow the medium to return to ambient temperature.

When the amine (IX) is a secondary amine ($R^1$ other than H), the reaction is stoichiometric; in this case, the molar ratio of the amine (IX) to the disulfide halide (VIII) is selected at between 1 and 2, better still between 1 and 1.5.

When the amine (IX) is a primary amine ($R^1$ represents H), then the quantity used depends on the nature of the desired reaction product. In order to obtain an organosilicon compound of general formula (IV) in which $R^1$ represents H, the amine (IX) will be in an excess in the reaction medium. The molar ratio (IX)/(VIII) generally varies between 1 and 3, this ratio generally being the closest to 1, for example selected between 1 and 1.2.

In order to obtain an organosilicon compound of specific formula (VII), the molar ratio of the product (VIII) to the amine (IX) will be selected to be greater than or equal to 2. This molar ratio (VII)/(IX) will advantageously be between 2 and 2.3. The quantity of base to be used for this reaction will be readily determined by the person skilled in the art, the base having the role of trapping the hydrohalic acid released. The molar ratio of the base to the compound of formula (VIII) is greater than or equal to 1, for example between 1 and 3.

B) Method "B"

The polysilylated organosilicon compounds of general formula (IV) (specific formulae (V) to (VII) included) in which x=2 may also be obtained by reacting a disulfide of formula:

$(R^6O)_b R^5_{(3-b)}Si\text{-}A\text{-}S\text{—}S\text{-}J$ (X)

in which A, $R^5$, $R^6$ and b are as defined above and J represents the succinimido or phthalimido group which may possibly be substituted, on the amine (IX) defined above, in the presence of a base, preferably an organic base. The substituents of the phtalimido and succinimido groups are organic substituents compatible with the reaction used, that is to say which are non-reactive under the operating conditions used. The bases which are usable are those defined above for method A.

Advantageously, the reaction is carried out in an aprotic polar solvent and, preferably, an aliphatic halogenated hydrocarbon (such as methylene chloride or carbon tetrachloride) or a possibly halogenated aromatic hydrocarbon (such as a possibly halogenated benzene or a toluene). Preferably, the solvent is $CCl_4$. The reaction temperature is preferably between −10° C. and 100° C., more preferably between 10° C. and 50° C. The respective quantities of compounds (IX) and (X) used depend on the type of organosilicon compound desired, just as in the previous case (method A).

Reference will therefore be made to method A for the determination of the molar quantities of (IX), (X) and of base to be reacted.

C) Method "C"

The polysilylated organosilicon compounds of general formula (IV) (specific formulae (V) to (VII) included) in which x=2 may also be obtained by reacting an aminosulfide of formula:

$J\text{-}S\text{—}NR^1R^2$ (XI)

in which $R^1$, $R^2$ and J are as defined above, with a thiol of formula:

$(R^6O)_b R^5_{(3-b)}Si\text{-}A\text{-}SH$ (XII)

in which A, $R^5$, $R^6$ and b are as defined above, in the presence of a base, the base preferably being as defined above.

For this reaction, the reaction temperature advantageously varies between 10 and 40° C., more preferably between 15 and 30° C., for example between 18 and 25° C.

The reaction of compound (XII) on compound (XI) is generally carried out in a polar aprotic solvent as defined in the case of method B. Preferably, the solvent is benzene or toluene. The reaction is a stoichiometric reaction. However, it is preferred to operate in the presence of a slight excess of compound (XI). Thus, the molar ratio of (XI) to (XII) will generally be between 1 and 1.5, better still between 1 and 1.3.

This variant C is in particular carried out for the preparation of the organosilicon compounds of general formula (IV) (specific formulae (V) to (VII) included) in which $R^1$ is other than a hydrogen atom.

The compounds of formula (VIII) may be prepared by reacting sulfur dichloride ($SCl_2$) on an appropriate mercaptosilane of formula (XII) as defined above, in the presence of an organic base, and preferably in the presence of triethylamine. This reaction is for example carried out in an ether at a temperature of −78° C. to −50° C. The organic bases and the ethers are generally as defined above.

The amines (IX) are commercial amines, or can be easily prepared from commercial products.

The compounds of formula (X) are easily prepared by reacting a thiol of formula (XII) as defined above on the halide of formula:

J-S-Hal (XIII)

where J and Hal are as defined above.

This reaction is preferably carried out in the presence of a base, in particular an organic base, at a temperature of 10° C. to 50° C., for example of from 15° C. to 30° C., in particular between 18° C. and 25° C., in a polar aprotic solvent generally as defined in method B. Preferably, the solvent is carbon tetrachloride, the base is triethylamine and the temperature is ambient temperature. This reaction is stoichiometric; nevertheless, it is desirable to operate in the presence of a deficiency of thiol (XII). Thus, the molar ratio of compound (XIII) to compound (XII) is advantageously between 1 and 1.5, better still between 1 and 1.3.

The compounds of formula (XI) are easily obtained by reacting an amine (IX) on the halide of formula (XIII), in the presence of an organic base. This reaction is preferably carried out in a solvent of halogenated hydrocarbon type (and in particular carbon tetrachloride) at a temperature generally of between 10° C. and 50° C., preferably between 15° C. and 30° C., for example between 18° C. and 25° C. (ambient temperature). As organic base, any one of the bases defined above will be selected and, for example, triethylamine. In a variant, it is possible to use the reagent (IX) as base. In this case in question, at least two equivalents of amine (IX) will be used per 1 equivalent of the halide (XIII).

The compounds of formula (XII) are commercial compounds or can be easily prepared from commercial compounds.

Diagram 1 below illustrates a synthesis path for the compound (XIII):

In this diagram, J and Hal are as defined above and M represents an alkali metal, preferably Na or K.

The commercial compound (XIV) is transformed into an alkali metal salt by the action of an appropriate inorganic base, M-OH, in which M is an alkali metal, of alkali metal hydroxide type in a $C_1$-$C_4$ lower alcohol such as methanol or ethanol. This reaction generally takes place at a temperature of 15° C. to 25° C. The resulting salt of formula (XV) is caused to react with $S_2Cl_2$ to yield the compound (XVI). The reaction conditions which are advantageous for this reaction are a polar aprotic solvent of the halogenated aliphatic hydrocarbon type ($CH_2Cl_2$, $CCl_4$) and a temperature of between −20° C. and 10° C. Then, the action of Hal-Hal on the compound (XVI) yields the expected compound (XIII).

In this latter step, operation is preferably in a polar aprotic solvent of halogenated aliphatic hydrocarbon type (such as chloroform or dichloromethane) at a temperature of between 15° C. and the reflux temperature of the solvent, preferably between 40° C. and 80° C., for example between 50° C. and 70° C. According to one preferred embodiment, Hal represents chlorine, in which case Hal-Hal is introduced into the reaction medium in gaseous form.

D) Method "D"

The polysilylated organosilicon compounds of general formula (IV) (specific formulae (V) to (VII) included) in which x=3 may be obtained by combining the following steps:

(1) reacting the thiol of formula (XII) with S2(Hal)$_2$, where Hal represents a halogen atom, and preferably chlorine, in the presence of a base, preferably an organic base, to give:

$(R^6O)_bR^5_{(3-b)}$Si-A-S—S—S-Hal (XVII)

This reaction is carried out for example in an ether at a temperature of −78° C. to −50° C. The organic bases and the ethers are generally as defined above in method A; and (2) reacting the compound (XVII) on the appropriate amine of formula (IX) in the presence of a base, preferably an organic base; for more details, reference may be made to the operating method described above with reference to the performance of method A.

(E) Method "E"

The polysilylated organosilicon compounds of general formula (IV) (specific formulae (V) to (VII) included) in which x=4 may be obtained by combining the following steps:

(1) reacting the disulfide halide of formula (VIII) or the trisulfide halide of formula (XVII) with the required quantity of elemental sulfur [supplying 2 sulfur atoms in the case of compound (VIII) or supplying 1 sulfur atom in the case of compound (XVII)], operating at a temperature of from 70° C. to 170° C., possibly in the presence of an aromatic solvent, to give the compound of formula:

$(R^6O)_bR^5_{(3-b)}$Si-A-S—S—S—S-Hal (XVIII)

(2) reacting the compound of formula (XVIII) on the appropriate amine of formula (IX) in the presence of a base, preferably an organic base; for more details, reference may be made to the operating method described above with reference to the performance of method A.

II-5. Various Additives

Of course, the rubber compositions according to the invention also comprise all or same of the additives usually used in diene rubber compositions intended for the manufacture of tires, such as, for example, plasticizers, extender oils, protective agents such as anti-ozone waxes, chemical antiozonants, antioxidants, anti-fatigue agents, adhesion promoters, coupling activators such as described for example in the aforementioned applications WO00/05300 and WO00/05301, reinforcing resins such as described in WO02/10269, a cross-linking system based either on sulfur or on sulfur and/or peroxide and/or bismaleimide donors, vulcanization accelerators, vulcanization activators, etc. There may also be associated with the reinforcing inorganic filler, if necessary, a conventional poorly reinforcing or non-reinforcing white filler, such as particles of clay, bentonite, talc, chalk or kaolin.

The rubber compositions according to the invention may also contain, in addition to the organosilicon compounds previously described, agents for covering the reinforcing inorganic filler, comprising for example the single Y function, or more generally processing aids liable, in known manner, owing to an improvement in the dispersion of the inorganic filler in the rubber matrix and to a reduction in the viscosity of the compositions, to improve their ability to be worked in the uncured state, these agents, being, for example, alkylalkoxysilanes, in particular alkyltriethoxysilanes, such as for example 1-octyl-triethoxysilane sold by Degussa-Hüls under the name Dynasylan Octeo, or 1-hexadecyl-triethoxysilane sold by Degussa-Hüls under the name Si216, polyols, polyethers (for example polyethylene glycols), primary, secondary or tertiary amines (for example trialkanolamines), hydroxylated or hydrolysable polyorganosiloxanes, for example $\alpha,\omega$-dihydroxy-polyorganosiloxanes (in particular $\alpha,\omega$-dihydroxy-polydimethylsiloxanes).

II-6. Preparation of the Rubber Compositions

The compositions are produced in suitable mixers, using two successive preparation phases well-known to the person skilled in the art: a first phase of thermomechanical working or kneading (sometimes referred to as "non-productive" phase) at high temperature, up to a maximum temperature ($T_{max}$) of between 110° C. and 190° C., preferably between 130° C. and 180° C., followed by a second phase of mechanical working (sometimes referred to as "productive" phase) at lower temperature, typically less than 120° C., for example between 60° C. and 100° C., during which finishing phase the cross-linking or vulcanization system is incorporated; such phases have been described for example in the aforementioned applications EP 501 227, EP 735 088, EP 810 258, EP 881 252, WO00/05300, WO00/05301 or WO02/10269.

The manufacturing process according to the invention is characterisized in that at least the reinforcing inorganic filler and the organosilicon compound are incorporated by kneading into the diene elastomer, during the first, so-called non-productive, phase, that is to say that at least these different base constituents are introduced into the mixer and are kneaded thermomechanically, in one or more steps, until a maximum temperature of between 110° C. and 190° C., preferably between 130° C. and 180° C., is reached.

By way of example, the first (non-productive) phase is effected in a single thermomechanical step during which in a first phase all the base constituents necessary (diene elastomer, reinforcing inorganic filler and organosilicon compound), then in a second phase, for example after one to two minutes of kneading, any complementary covering agents or processing agents and other various additives, with the exception of the vulcanization system, are introduced into a suitable mixer, such as a conventional internal mixer. When the apparent density of the reinforcing inorganic filler is low (generally the case of silicas), it may be advantageous to divide the introduction thereof into two or more parts. A second step of thermomechanical working may be added in this internal mixer, after the mixture has dropped and after intermediate cooling (cooling temperature preferably less than 100° C.), with the aim of making the compositions undergo complementary thermomechanical treatment, in particular in order to improve further the dispersion, in the elastomeric matrix, of the reinforcing inorganic filler and its coupling agent. The total duration of the kneading, in this non-productive phase, is preferably between 2 and 10 minutes.

After cooling of the mixture thus obtained, the vulcanization system is then incorporated at low temperature, generally in an external mixer such as an open mill; the entire mixture is then mixed (productive phase) for several minutes, for example between 5 and 15 minutes.

The final composition thus obtained is then calendered, for example in the form of a film or a sheet, or alternatively extruded, for example in order to form a rubber profiled element used for manufacturing semi-finished products such as treads, crown reinforcement plies, sidewalls, carcass reinforcement plies, beads, protectors, inner tubes or airtight internal rubbers for tubeless tires.

In summary, the process according to the invention for preparing an elastomeric composition usable for the manufacture of semi-finished products for tires comprises the following steps:

incorporating in a diene elastomer, in a mixer, at least:
  a reinforcing inorganic filler;
  as (inorganic filler/diene elastomer) coupling agent, an organosilicon compound which is at least bifunctional and can be grafted onto the elastomer by means of a sulfur group;
thermomechanically kneading the entire mixture, in one or more stages, until a maximum temperature of between 110° C. and 190° C. is reached;
cooling the entire mixture to a temperature of less than 100° C.;
then incorporating a vulcanization system; and
kneading the entire mixture until a maximum temperature of less than 120° C. is reached, said sulfur group being a group having a polythiosulfenamide function of formula (I) above.

The vulcanization (or curing) is carried out in known manner at a temperature generally between 130° C. and 200° C., preferably under pressure, for a sufficient time which may vary, for example, between 5 and 90 minutes, depending, in particular, on the curing temperature, the vulcanization system adopted and the vulcanization kinetics of the composition in question.

The vulcanization system proper is preferably based on sulfur and a primary vulcanization accelerator, in particular an accelerator of the sulfenamide type. To this cross-linking system there are added, incorporated during the first non-productive phase and/or during the productive phase, various known secondary accelerators or vulcanization activators such as zinc oxide, stearic acid, guanidine derivatives (in particular diphenylguanidine), etc. The sulfur is used in a preferred amount of between 0.5 and 10 phr, more preferably of between 0.5 and 5.0 phr, for example between 0.5 and 3.0 phr when the invention is applied to a tire tread. The primary vulcanization accelerator is used in a preferred amount of between 0.5 and 10 phr, more preferably of between 0.5 and 5.0 phr in particular when the invention applies to a tire tread.

The invention relates to the rubber compositions previously described, both in the "uncured" state (i.e. before curing) and in the "cured" or vulcanized state (i.e. after cross-linking or vulcanization). The compositions according to the invention may be used alone or in a blend (i.e. in a mixture) with any other rubber composition usable for manufacturing tires.

EXAMPLES OF EMBODIMENT OF THE INVENTION

III-1. Synthesis of the Coupling Agents

The coupling agents usable by preference in the compositions of the invention are dithiosulfenamide silanes, more preferably alkoxysilanes corresponding to one of the formulae (V-1) to (V-3) and (VII-1) to (VII-3), synthesis methods for which are described hereafter, by way of non-limitative examples.

The melting points (Pf) expressed in degrees Celsius (° C.) are determined by projection on a KOFFLER apparatus which has been previously calibrated ($\Delta T=\pm 2°$ C.). The boiling points ($Eb_{pressure}$) are given in millibars (mbar). The 250 MHz proton ($^1$H-NMR) and carbon ($^{13}$C-NMR) spectra are recorded on a BRUCKER AC 250 spectrometer. The chemical shifts ($\delta c$ and $\delta h$) are expressed in parts per million (ppm) relative to deuterochloroform ($CDCl_3$). The coupling constants J are expressed in Hz. The following abbreviations are used: s, singlet; bs, broad singlet; d, doublet; t, triplet; q, quartet; m, multiplet.

All the manipulations with the alkoxysilanes are carried out in an inert atmosphere and under anhydrous conditions.

Example 1

In this first test, N-(3'-trimethoxysilylpropyldithio)-3-propyltriethoxysilyl-propylamine is synthesized.

A solution of 100 mmol (or 10.3 g) of sulfur dichloride in 400 ml of anhydrous diethyl ether is cooled to $-78°$ C. in a two-liter three-necked flask under an argon atmosphere. With mechanical stirring, a mixture of 3-mercaptopropyltrimethoxysilane (100 mmol) and triethylamine (100 mmol, or 10.2 g) in 150 ml of anhydrous diethyl ether is added drop by drop in one hour. The reaction medium is stirred at this temperature for one hour then a mixture of 3-(triethoxysilyl)-propylamine (110 mmol) and triethylamine (100 mmol, or 10.2 g) in 100 ml of anhydrous diethyl ether is added drop by drop in one hour. The reaction medium is allowed to return to ambient temperature, then the triethylamine chlorohydrate is filtered and concentration is carried out at reduced pressure. Distillation at reduced pressure makes it possible to remove the traces of unreacted reagents.

NMR analysis confirms that the final compound thus obtained (appearance of a yellow oil, yield 75%) corresponds to the aforementioned specific formula (V-1):

$^1$H NMR ($CDCl_3$) $\delta_H$
0.62 (t, 2H, Si—CH$_2$); 0.74 (t, 2H, Si—CH$_2$); 1.21 (t, 9H, CH$_3$—CH$_2$—O);
1.69 (m, 2H, CH$_2$); 1.82 (m, 2H, CH$_2$); 2.88 (t, 2H, SCH$_2$);
3.07 (t, 2H, NCH$_2$); 3.55 (s, 9H, O—CH$_3$); 3.81 (q, 6H, —OCH$_2$).
$^{13}$C NMR ($CDCl_3$) $\delta_C$
6.2 (Si—CH$_2$); 9.7 (Si—CH$_2$); 18.4 (CH$_3$—CH$_2$); 20.9 (CH$_2$);
44.0 (S—CH$_2$); 50.6 (—OCH$_3$); 54.9 (N—CH$_2$); 58.5 (—OCH$_2$).

Thus an organoxysilane-dithiosulfenamide of general formula (V) was prepared in which:
R$^1$=H;
R$^2$=-Z-Si(OR$^4$)$_3$;
Z=(CH$_2$)$_3$ (propylene);
R$^4$=ethyl; R$^6$=methyl;
a=b=3.

Example 2

By implementing the same operating procedure, but replacing the 3-mercaptopropyltrimethoxysilane with 3-mercaptopropyltriethoxysilane, there is obtained, as attested by NMR analysis, N-(3'-triethoxysilylpropyldithio)-3-triethoxysilylpropylamine (appearance of a yellow oil, yield 86%) of the aforementioned specific formula (V-2):

$^1$H NMR ($CDCl_3$) $\delta_H$
0.61 (t, 2H, Si—CH$_2$); 0.72 (t, 2H, Si—CH$_2$); 1.21 (m, 18H, CH$_3$—CH$_2$—O);
1.69 (2, 2H, CH$_2$); 1.83 (m, 2H, CH$_2$); 2.89 (t, 2H, S—CH$_2$);
3.05 (t, 2H, N—CH$_2$); 3.81 (m, 12H, —OCH$_2$).
$^{13}$C NMR ($CDCl_3$) $\delta_C$
6.2 (Si—CH$_2$); 9.7 (Si—CH$_2$); 18.3 (CH$_3$—CH$_2$); 18.4 (CH$_3$—
20.9 (CH$_2$); 23.8 (CH$_2$); 44.0 (S—CH$_2$); 54.9 (N—CH$_2$); 58.5 (—OCH$_2$);
58.6 (—OCH$_2$).

Example 3

By implementing the operating procedure of Example 1, but replacing the 3-(triethoxysilyl)-propylamine by cyclohexylamine and using 55 mmol of cyclohexylamine, there is obtained, as attested by NMR analysis, N,N-bis(3-trimethoxysilylpropyldithio)cyclohexylamine (appearance of an orange oil, yield 85%), of the aforementioned specific formula (VII-1):

$^1$H NMR ($CDCl_3$) $\delta H$
0.73 (m, 4H, Si—CH$_2$); 1.22 (m, 2H, CH$_2$); 1.64-1.92 (m, 8H, CH$_2$);
2.25 (m, 2H, CH$_2$); 2.40 (m, 2H, CH$_2$); 2.88 (m, 4H, SCH$_2$); 3.01 (m, 1H, NCH);
3.56 (s, 18H, —OCH$_3$).
$^{13}$C NMR ($CDCl_3$) $\delta_C$
8.3 (2×Si—CH$_2$); 22.3 (2×CH$_2$); 26.5 (CH$_2$); 25.9 (2×CH$_2$
41.6 (2×S—CH$_2$); 50.4 (—OCH$_3$); 59.9 (N—CH).

Thus an organoxysilane-dithiosulfenamide of formula (VII) was prepared in which:
R$^1$=cyclohexyl;
Z=(CH$_2$)$_3$ (propylene);
R$^4$=methyl;
a=3.

Example 4

By implementing the same operating procedure as Example 3, but replacing the 3-mercaptopropyltrimethox- ysilane with 3-mercaptopropyltriethoxysilane, there is obtained, as attested by NMR analysis, N,N-bis(3-triethoxysilylpropyldithio)cyclohexylamine (appearance of an orange oil, yield 90%), of the aforementioned specific formula (VII-2):

$^1$H NMR (CDCl$_3$) δH
0.75 (t, 4H, Si—CH$_2$); 1.21 (m, 20H, 6×CH$_3$ and CH$_2$); 1.62-1.91 ( CH$_2$);
2.25 (m, 2H, CH$_2$); 2.40 (m, 2H, CH$_2$); 2.89 (t, 4H, SCH$_2$); 3.01 (m, 1H, NCH);
3.81 (q, 12H, —OCH$_2$).
$^{13}$C NMR (CDCl$_3$) δ$_C$
9.6 (2×Si—CH$_2$); 18.1 (2×CH$_3$); 22.3 (2×CH$_2$); 26.5 (CH$_2$
32.7 (2×CH$_2$); 41.5 (S—CH$_2$); 58.3 (—OCH$_2$); 59.8 (N—CH).

Example 5

By implementing the same operating procedure as Example 3, but replacing the cyclohexylamine with 3-(triethoxysilyl)propylamine, there is obtained, as attested by NMR analysis, N,N-bis(3-triethoxysilyl)propyldithio)-3-triethoxysilyl)propylamine (appearance of a yellow oil, yield 87%) of the specific formula (VII-3):

$^1$H NMR (CDCl$_3$) δ$_H$
0.62 (t, 2H, Si—CH$_2$); 0.74 (t, 4H, Si—CH$_2$); 1.22 (t, 9H, CH$_3$—CH$_2$—O);
1.67 (m, 2H, CH$_2$); 1.83 (m, 4H, CH$_2$); 2.82 (t, 4H, S—CH$_2$);
3.05 (m, 2H, CH$_2$); 3.55 (s, 18H, O—CH$_3$); 3.80 (q, 6H, —OCH$_2$).
$^{13}$C NMR (CDCl$_3$) δ$_C$
6.2 (Si—CH$_2$); 9.7 (Si—CH$_2$); 18.4 (CH$_3$—CH$_2$); 20.9 (CH$_2$);
44.0 (S—CH$_2$); 50.6 (—OCH$_3$); 54.9 (N—CH$_2$); 58.5 (—OCH$_2$).

Example 6

In this test N-methyl-N-(3'-triethoxysilylpropyldithio)-3'-trimethoxysilylpropylamine of formula (V-3) is synthesized in three steps.

a) Phthalimidosulfenyl Chloride:

A suspension of 0.1 mole (35.6 g) phthalimide disulfide in 350 ml chloroform in a three-necked flask provided with magnetic stirring was heated to 60° C. A stream of chlorine gas is passed through until complete solubilization occurs. The reaction medium is allowed to return to ambient temperature, then the solvent is evaporated at reduced pressure. The phthalimidosulfenyl chloride is recrystallized in dichloromethane.
Yield: 99%
Appearance: yellow crystals
Melting point: 114° C.
$^1$H NMR (CDCl$_3$) δ$_H$:
7.90 (m, aromatic 2H); 8.01 (m, aromatic 2H).
$^{13}$C NMR (CDCl$_3$) δ$_H$:
124.7 (2 aromatic CH); 131.6 (2 aromatic C);
135.6 (2 CH aromatic); 165.8 (2 C=O).

b) N-(N'-methyl-N'-3-trimethoxysilylpropyl)aminothiophthalimide:

The above phthalimidosulfenyl chloride (0.1 mol, or 21.35 g) is dissolved in 350 ml of chloroform in a three-necked flask provided with magnetic stirring and in an inert atmosphere. 0.21 mol of N-methyl-N-(3-trimethoxysilylpropyl)amine diluted in 50 ml chloroform is added drop by drop at ambient temperature. The mixture is stirred for 3 hours then the solvent is evaporated. It is taken up with diethyl ether, the chlorohydrate of the amine is filtered then concentrated at reduced pressure.
Yield: 88%
Appearance: orange oil
$^1$H NMR (CDCl$_3$)δ$_H$
0.64 (t, 2H, Si—CH$_2$); 1.78 (m, 2H, CH$_2$); 2.93 (H$_3$C—N); 3.05 (t, 2H N—CH$_2$); 3.56 (s, 9H—OCH$_3$); 7.77 (m, aromatic 2H);
7.92 (m, aromatic 2H).
$^{13}$C NMR (CDCl$_3$) δ$_c$
5.9 (SiCH$_2$); 21.0 (CH$_2$); 46.8 (N—CH$_3$); 50.5 (—OCH$_3$);
62.9 (N—CH$_2$); 123.8 (2 aromatic CH); 132.3 (2 aromatic C);
134.2 (2 aromatic CH); 169.5 (2 C=O).

c) N-methyl-N-(3'-triethoxysilylpropyldithio)-3'-trimethoxysilyipropylamine:

The sulfide obtained in the previous step (50 mmol) is dissolved in 250 ml of benzene in a three-necked flask provided with magnetic stirring and in an inert atmosphere. The 3-mercaptopropyltriethoxysilane (45 mmol) diluted in a minimum of benzene is added in one step. It is left with stirring at ambient temperature for 48 hours. The phthalimide which had precipitated and the excess sulfide were filtered off, then the solvent was evaporated at reduced pressure.

As attested by NMR analysis, there is thus obtained N-methyl-N-(3'-triethoxysilylpropyldithio)-3'-trimethoxysilylpropylamine (appearance of a yellow oil, yield 95%), of the aforementioned specific formula (V-3):

$^1$H NMR (CDCl$_3$) δ$_H$
0.61 (t, 2H, Si—CH$_2$); 0.72 (t, 2H, Si—CH$_2$); 1.22 (t, 9H, CH$_3$); CH$_2$); 1.80 (m, 2H, CH$_2$); 2.68 (NCH$_3$); 2.75 (t, 2H, CH$_2$); 2.88 (t, 2H, CH$_2$); 3.57 (s, 9H, —OCH$_3$); 3.82 (q, 6H, O—CH$_2$).
$^{13}$C NMR (CDCl$_3$) δ$_C$
6.2 (Si—CH$_2$); 9.7 (Si—CH$_2$); 18.4 (CH$_3$—CH$_2$); 20.9 (CH$_2$);

44.0 (S—CH$_2$); 46.1 (—NCH$_3$); 50.6 (—OCH$_3$); 58.5 (—OCH$_2$); 60.9 (N—CH

Thus a dithiosulfenamide organoxysilane of general formula (V) is obtained in which R$^1$=methyl;
R$^2$=-Z-Si(OMe)$_3$;
Z=(CH$_2$)$_3$ (propylene);
R$^4$=methyl; R$^6$=ethyl;
a=b=3.

III-2. Preparation of the Rubber Compositions

For the following tests, the procedure is as follows: the diene elastomer (or the mixture of diene elastomers, if applicable), the reinforcing filler, the coupling agent, then, after one to two minutes of kneading, the various other ingredients, with the exception of the vulcanization system, are introduced into an internal mixer filled to 70%, the initial tank temperature of which is approximately 60° C. Thermomechanical working (non-productive phase) is then performed in two stages (total duration of kneading equal to about 7 minutes), until a maximum "dropping" temperature of about 165° C. is reached. The mixture thus obtained is recovered, cooled and then the vulcanization system (sulfur and sulfenamide accelerator) is added on an external mixer (homo-finisher) at 30° C., by mixing everything (productive phase) for 3 to 10 minutes.

The compositions thus obtained are then calendered either in the form of thin slabs (thickness of 2 to 3 mm) or thin sheets of rubber in order to measure their physical or mechanical properties, or in the form of profiled elements usable directly, after cutting out and/or assembling to the desired dimensions, for example as semi-finished products for tires, in particular as tire treads.

In the tests which follow, the reinforcing inorganic filler (HD silica) constitutes the entire reinforcing filler, used in a preferred amount within a range from 50 to 100 phr; but it goes without saying for the person skilled in the art that a fraction of the latter, preferably a minority fraction, could be replaced by carbon black.

III-3. Characterization of the Rubber Compositions

The object of this test is to demonstrate the improved (inorganic filler/diene elastomer) coupling performance in a composition according to the invention, compared with a composition of the prior art using a conventional TESPT coupling agent:

composition C-1: conventional TESPT silane;
composition C-2: silane-dithiosulfenamide of formula VII-2.

It will be recalled that TESPT is bis(3-triethoxysilylpropyl)tetrasulfide, of formula [(C$_2$H$_5$O)$_3$Si(CH$_2$)$_3$S$_2$]$_2$; it is sold, for example, by Degussa under the name Si69 (or X50S when it is supported to 50% by weight on carbon black), or alternatively by Witco under the name Silquest A1289 (in both cases, a commercial mixture of polysulfides S$_x$ having an average value of x which is close to 4).

The structural formula of TESPT is:

This formula should be compared to that of the dithiosulfenamide silane of formula VII-1:

It will be noted that part of the two chemical structures above is identical (Y function and hydrocarbon group Z—here propylene chain—making it possible to join Y and X), the only difference lying in the nature of the sulfur function (X function) which can be grafted onto the diene elastomer: polysulfide group Sx for the conventional composition, polythiosulfenamide group for the composition of the invention.

Table 1 gives the formulation of the two compositions (amounts of the various products expressed in phr); the vulcanization system is formed of sulfur and sulfenamide.

The two coupling agents are used here in an isomolar amount of silicon, that is to say that, whatever the composition, the same number of moles of Y functions (here Y=Si(OEt)$_3$) which are reactive with respect to the silica and its hydroxyl surface groups is used.

Relative to the weight of reinforcing inorganic filler, the amount of coupling agent is in both cases less than 10 phr, which represents less than 15% by weight relative to the quantity of reinforcing inorganic filler.

Figure 1:
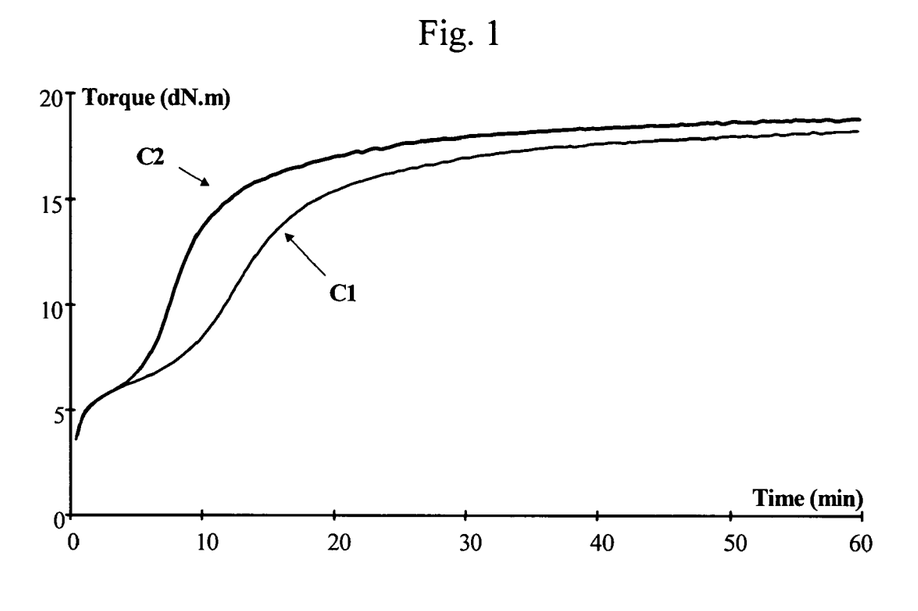
FIG. 1: rheograms (curing curves) recorded for rubber compositions whether or not in accordance with the invention.
Figure 2:
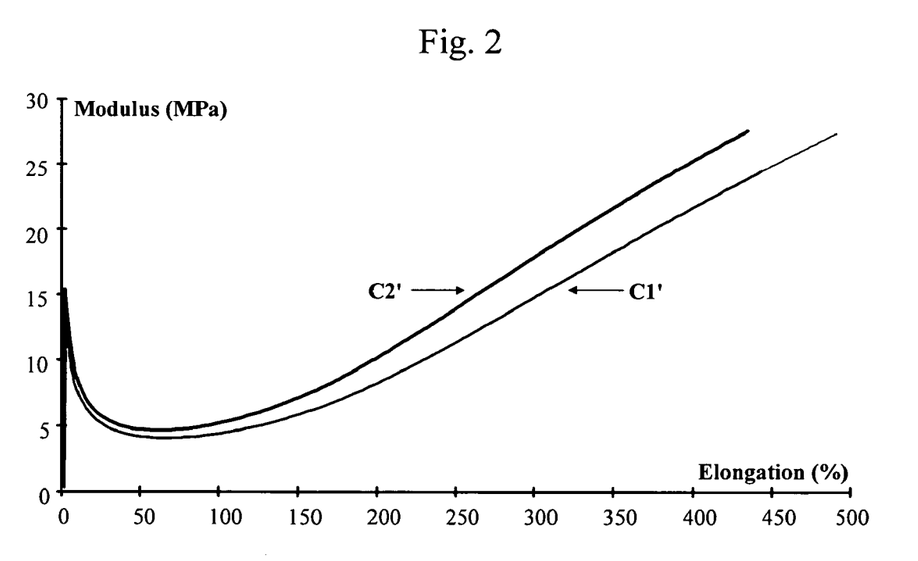
FIG. 2: curves of variation in modulus as a function of the elongation for these rubber compositions.

FIGS. 1 and 2 reproduce respectively the rheograms (torque in dN.m as a function of the vulcanization time in min) and, after curing (40 min at 150° C.), the curves of modulus (in MPa) as a function of elongation (in %); these curves are marked C1 and C2 in FIG. 1, then C1' and C2' in FIG. 2, and they correspond respectively to compositions C-1 and C-2.

First of all, the rheograms of FIG. 1 clearly show the superiority of the composition of the invention C-2: induction period (5.1 min after measurement in accordance with section 1-3) close to that of the control composition (7.5 min); maximum torque (19 dN.m after measurement) greater than that of the control composition (18 dN.m), finally and above all vulcanization kinetics distinctly faster, as is illustrated by a gradient of the rheogram (constant K) which is distinctly more marked between 30% and 80% conversion: the measurement (in accordance with section I-3) gives K=0.22 min$^{-1}$ for composition C-2, practically twice the gradient recorded for the control composition (K=0.13 min$^{-1}$); in other words the curing of the composition may be effected in a shorter time.

After curing (FIG. 2), the composition of the invention (curve C2), compared with the control composition (curve C1), reveals properties at break which are substantially equivalent, but a level of reinforcement (modulus) which is distinctly superior, in particular at high deformation (elongations of 100% and more), the distance between the two curves becoming all the more pronounced as the elongation increases. Such behavior clearly illustrates improved coupling between the reinforcing inorganic filler and the diene elastomer, which makes it possible to predict a very good ability of the composition of the invention to resist wear.

It will furthermore be noted that the Mooney plasticity, which is already low on the control composition, is unexpectedly reduced (close to 10%) on the composition of the invention (C-2), another advantage indicating an excellent ability of the compositions of the invention to be processed in the uncured state.

In conclusion, the coupling agent selected for the compositions according to the invention imparts to the latter high reinforcement properties, excellent processing properties in the uncured state and a very good ability to be vulcanized, which reveals an overall effectiveness greater than that of TESPT, which is still considered today as the (inorganic filler/elastomer) coupling agent of reference in diene rubber compositions reinforced with an inorganic filler such as a reinforcing silica.

The invention can be applied particularly advantageously in rubber compositions intended for the manufacture of treads for tires which have both low rolling resistance and high wear resistance, in particular when these treads are intended for tires for passenger vehicles, motorcycles or industrial vehicles of the heavy-vehicle type.

TABLE 1

|  | Composition No. | |
| --- | --- | --- |
|  | C-1 | C-2 |
| SBR (1) | 75 | 75 |
| BR (2) | 25 | 25 |
| silica (3) | 80 | 80 |
| alkoxysilane (4) | 6.4 | — |
| alkoxysilane (5) | — | 7.6 |
| DPG (6) | 1.5 | 1.5 |
| ZnO | 2.5 | 2.5 |
| stearic acid | 2 | 2 |
| sulfur | 1.1 | 1.1 |
| accelerator (7) | 2 | 2 |

(1) SSBR with 59.5% of 1-2 polybutadiene units; 26.5% of styrene; Tg = −29° C.; 75 phr dry SBR extended with an aromatic oil (total of SSBR + oil equal to 103 phr);
(2) BR with 4.3% of 1-2; 2.7% of trans; 93% of cis 1-4 (Tg = −106° C.);
(3) silica type "HDS" —Zeosil 1165 MP from Rhodia in the form of microbeads (BET and CTAB: approximately 150-160 m²/g);
(4) TESPT ("Si69" from Degussa);
(5) silane-dithiosulfenamide of formula VII-2 (synthesized in accordance with section III-1, ex. 4);
(6) diphenylguanidine ("Vulcacit D" from Bayer);
(7) N-cyclohexyl-2-benzothiazyl sulfenamide (from Flexsys: "Santocure" CBS).

What is claimed is:

1. A tire comprising an elastomeric composition based on a diene elastomer, an inorganic filler as reinforcing filler and a coupling agent comprising a polysilylated organosilicon compound which is at least bifunctional and is grafted on to the elastomer by means of a sulfur group having a polythiosulfenamide function, of formula:

$$\equiv\text{Si-A-S}_x\text{—NR}^1\text{R}^2, \quad \text{(I)}$$

in which:
A is a straight-chain or branched divalent bond group, which is capable of joining the polythiosulfenamide group to a first silicon atom of the organosilicon compound;
x is an integer or fractional number of from 2 to 4;
$R^1$ represents hydrogen, a monovalent hydrocarbon group or $R^2$;
$R^2$ represents the grouping:

$$\text{—B—Si}\equiv,$$

in which:
B is a straight-chain or branched divalent bond group;
Si represents a second silicon atom of the organosilicon compound.

2. The tire according to claim 1, wherein $R^1$ is selected from the group consisting of hydrogen, $C_1$-$C_8$ alkyls, $C_5$-$C_{10}$ cycloalkyls, $C_6$-$C_{18}$ aryls, $(C_6$-$C_{18})$aryl-$(C_1$-$C_8)$alkyls, and $R^2$.

3. The tire according to claim 2, wherein $R^1$ is selected from the group consisting of hydrogen, methyl, ethyl, propyl, isopropyl, butyl, hexyl, benzyl, cyclohexyl, phenyl, and $R^2$.

4. The tire according to claim 1, wherein $R^2$ represents the grouping:

$$\text{—B—SiR}^3_{(3-a)}(\text{OR}^4)_a,$$

in which:
$R^3$ represents a monovalent hydrocarbon group;
$R^4$ represents hydrogen or a monovalent hydrocarbon group, which is identical to or different from $R^3$, and
a is an integer equal to 1, 2 or 3.

5. The tire according to claim 4, wherein the radicals $R^3$ and $R^4$ are selected from the group consisting of $C_1$-$C_8$ alkyls, $C_5$-$C_{10}$ cycloalkyls, and phenyl.

6. The tire according to claim 5, wherein the radicals $R^3$ and $R^4$ are $C_1$-$C_4$ alkyls.

7. The tire according to claim 1, wherein A and B, which are identical or different, represent a group consisting of carbon, hydrogen and optionally one or more heteroatoms, and comprising from 1 to 18 carbon atoms.

8. The tire according to claim 7, wherein A and B, which are identical or different, are selected from the group consisting of $C_1$-$C_{18}$ alkylenes and $C_6$-$C_{12}$ arylenes.

9. The tire according to claim 8, wherein the sulfur group satisfies the formula:

$$\equiv\text{Si-Z-S}_x\text{—NR}^1\text{-Z-Si}\equiv, \quad \text{(II)}$$

wherein the groupings Z, which are identical or different, represent a $C_1$-$C_8$ alkylene.

10. The tire according to claim 8, wherein the sulfur group satisfies the formula:

$$\equiv\text{Si-Z-S}_x\text{—NR}^1\text{—S}_y\text{-Z-Si}\equiv, \quad \text{(III)}$$

wherein the groupings Z, which are identical or different, represent a $C_1$-$C_8$ alkylene, and y, which is identical to or different from x, is an integer or fractional number from 2 to 4.

11. The tire according to claim 1, wherein the diene elastomer is selected from the group consisting of polybutadienes, synthetic polyisoprenes, natural rubber, butadiene copolymers, isoprene copolymers and mixtures of these elastomers.

12. The tire according to claim 1, wherein said composition comprises between 10 and 200 phr (parts by weight per hundred parts of elastomer) of the inorganic filler.

13. The tire according to claim 1, wherein the quantity of coupling agent is between 1 and 20 phr.

14. The tire according to claim 1, wherein the organosilicon compound is a silane-polythiosulfenamide of formula:

$$(R^6O)_b R^5_{(3-b)}\text{Si-A-S}_x\text{—NR}^1\text{—B—SiR}^3_{(3-a)}(OR^4)_a, \quad \text{(IV)}$$

in which:
$R^5$ represents a monovalent hydrocarbon group;
$R^6$ hydrogen or a monovalent hydrocarbon group, which is identical to or different from $R^5$;
b is an integer equal to 1, 2 or 3; and
$R^5$, $R^6$ and b are, respectively, identical to or different from $R^3$, $R^4$ and a.

15. The tire according to claim 14, wherein the silane satisfies the formula:

$$(R^6O)_b R^5_{(3-b)}Si\text{-}Z\text{-}S_x\text{—}NR^1\text{-}Z\text{-}SiR^3_{(3-a)}(OR^4)_a, \quad (V)$$

in which the groupings Z, which are identical or different, represent a $C_1\text{-}C_4$ alkylene, the radicals $R^3$, $R^4$, $R^5$ and $R^6$ representing a $C_1\text{-}C_3$ alkyl.

16. The tire according to claim 15, wherein Z is propylene, and $R^3$, $R^4$, $R^5$ and $R^6$ are selected from the group consisting of methyl and ethyl.

17. The tire according to claim 14, wherein the silane satisfies the symmetrical formula:

$$[(R^4O)_a R^3_{(3-a)}Si\text{-}Z\text{-}S_x\text{—}]_2NR^1 \quad (VII)$$

18. The tire according to claim 17, wherein Z is propylene, and $R^3$, $R^4$, $R^5$ and $R^6$ are selected from among methyl and ethyl.

19. The tire according to claim 15, wherein x is an integer or fractional number of from 2 to 3.

20. The tire according to claim 19, wherein x is equal to 2.

21. The tire according to claim 14, wherein the silane satisfies the formula:

$$(R^6O)_b R^5_{(3-b)}Si\text{-}Z\text{-}S_x\text{—}NR^1\text{—}S_y\text{-}Z\text{-}SiR^3_{(3-a)}(OR^4)_a \quad (VI)$$

in which the groupings Z, which are identical or different, represent a $C_1\text{-}C_4$ alkylene, the radicals $R^3$, $R^4$, $R^5$ and $R^6$ represent a $C_1\text{-}C_3$ alkyl, and y, which is identical to or different from x, is an integer or fractional number of from 2 to 4.

22. The tire according to claim 21, wherein Z is propylene, and $R^3$, $R^4$, $R^5$ and $R^6$ are selected from the group consisting of methyl and ethyl.

23. The tire according to claim 21, wherein x and y are integers or fractional numbers of from 2 to 3.

24. The tire according to claim 23, wherein x and y are equal to 2.

25. The tire according to claim 14, wherein $R^1$ is selected from the group consisting of hydrogen, methyl, ethyl, propyl, isopropyl, hexyl, benzyl, cyclohexyl and phenyl.

26. The tire according to claim 1, wherein the inorganic filler is silica.

27. The tire according to claim 1 having a tread, wherein said elastomeric composition is present in the tread of the tire.

28. The tire according to claim 9 having a tread, wherein said elastomeric composition is present in the tread of the tire.

29. The tire according to claim 10 having a tread, wherein said elastomeric composition is present in the tread of the tire.

30. The tire according to claim 14 having a tread, wherein said elastomeric composition is present in the tread of the tire.

31. The tire according to claim 15 having a tread, wherein said elastomeric composition is present in the tread of the tire.

32. The tire according to claim 17 having a tread, wherein said elastomeric composition is present in the tread of the tire.

33. The tire according to claim 21 having a tread, wherein said elastomeric composition is present in the tread of the tire.

* * * * *